July 29, 1969  CARL-ERIK ANDERSSON ET AL  3,457,976
TOOLS FOR TIMBER HARVESTING AND DIVIDING APPARATUS
Filed Feb. 8, 1967  3 Sheets-Sheet 3
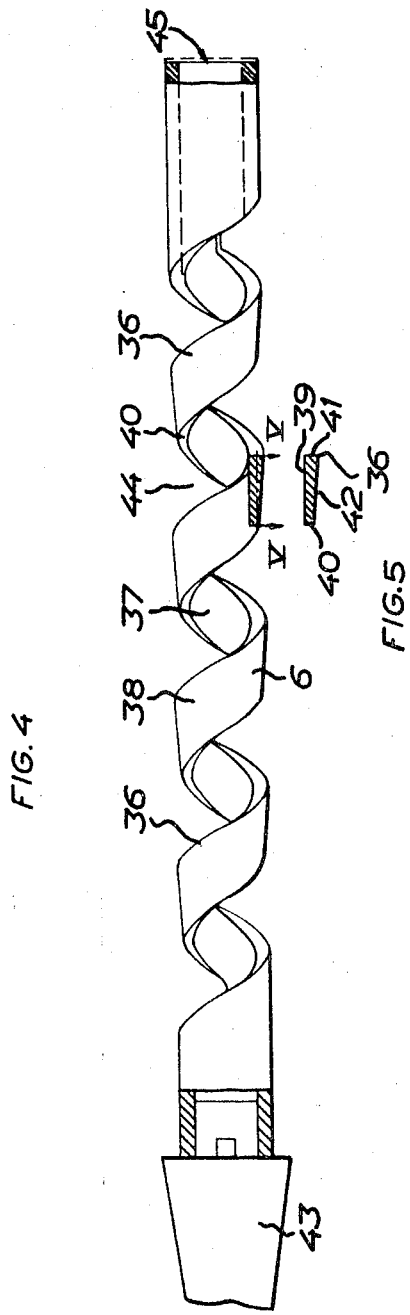
INVENTORS:
CARL-ERIK ANDERSSON &
RUNE AX:SON KROOK United States Patent Office
3,457,976
Patented July 29, 1969

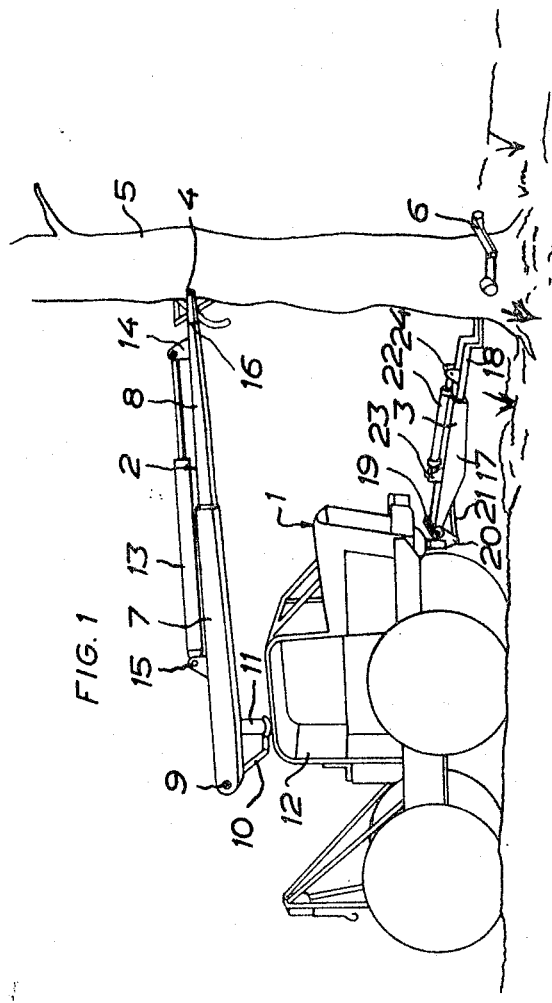

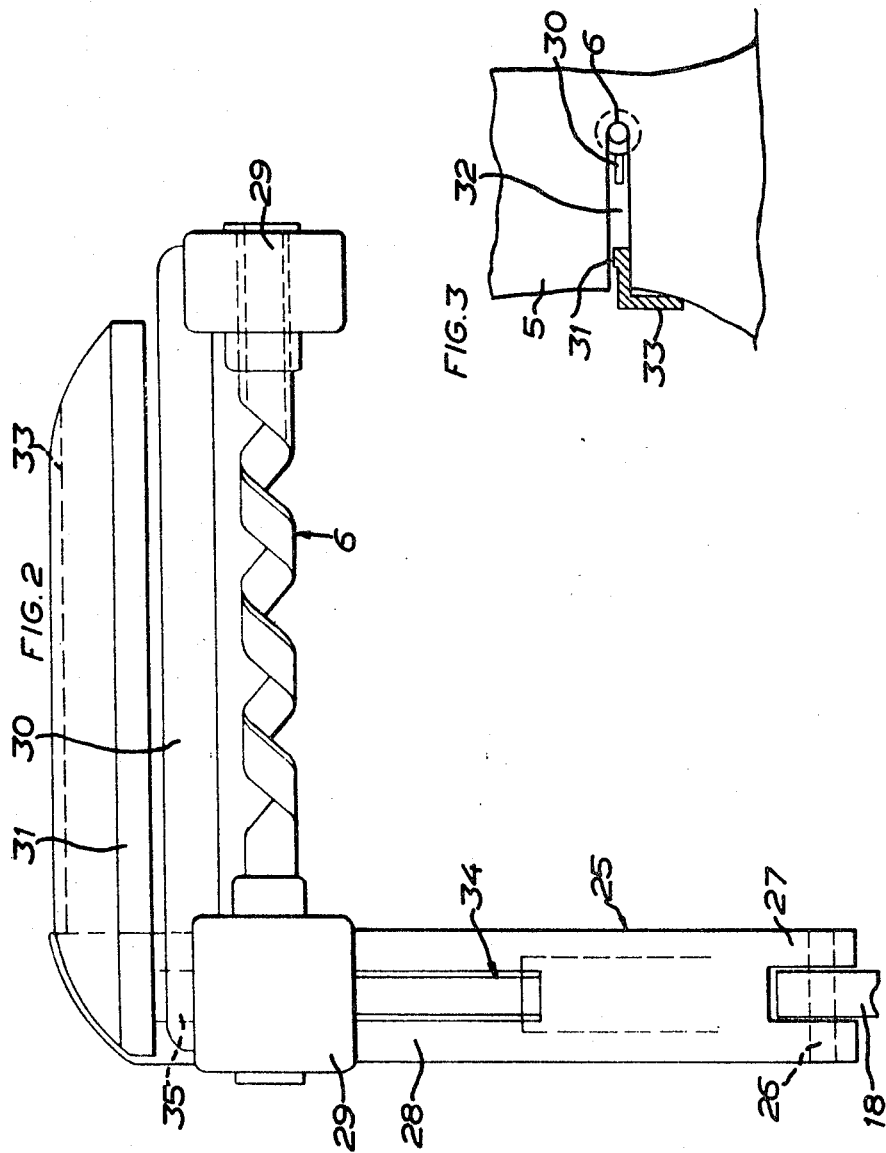

3,457,976
TOOLS FOR TIMBER HARVESTING AND
DIVIDING APPARATUS
Carl-Erik Andersson and Rune Krook, Malmo, Sweden, assignors to Kockums Mekaniska Verkstads Aktiegolag Stora Varvsgatan, Malmo, Sweden
Filed Feb. 8, 1967, Ser. No. 614,686
Claims priority, application Sweden, Feb. 15, 1966, 1,911/66
Int. Cl. B27b 33/00, 33/18; A01g 23/08
U.S. Cl. 144—221                          4 Claims

ABSTRACT OF THE DISCLOSURE

A tool for use in apparatus for harvesting standing timber or dividing felled trees or tree sections, said tool having a helically coiled cutting edge and being adapted for rotation about its longitudinal axis, the helically coiled cutting edge of the tool being formed by one edge, located in the outer periphery of the tool, of a helically coiled band constituting the tool, said band defining, between the cutting edge of one convolution of the band and the rear edge of the adjacent convolution, a likewise helically extending groove which communicates with an axial hollow delimited by the band.

---

Rationalized timber harvesting aims at reducing the various harvesting phases to a minimum of rapid operations realized by mechanical means, to save time and labour. To this end, it shall be possible to fell a tree by means of a single continuous cut without any preliminary operations. In the most advanced procedure the tree is simply cut off and severed from the root by means of a wedging blade moving against an anvil, whereupon the tree is divided in the same way into measured log sections. This harvesting arrangement, however, will result in the formation of cracks reaching from the surface of the cut almost half a meter into the logs, thus deteriorating them considerably. Use has also been made of tools having a helically coiled edge and operating in the manner of a milling cutter. Such tools operate but slowly, presumably because the millings are not carried away sufficiently rapidly.

These and further deficiencies inherent in the prior-art tools are eliminated by the tool according to the present invention.

The invention will now be described more fully with reference to the accompanying drawings in which:

FIGURE 1 is a perspective view of a tree harvesting machine in operation, which is equipped with the tool according to the invention;

FIGURE 2 is a view on a larger scale of the tool and the adjoining parts of the tree harvesting machine;

FIGURE 3 is a view illustrating the use of the tool;

FIGURE 4 is a side elevational view, on a still larger scale, of the tool in a more detailed showing;

FIGURE 5 is a section on line V—V in FIGURE 4.

The tree harvesting machine illustrated in FIGURE 1 comprises a four-wheeled tractor 1 having a two-piece chassis, a guiding arm 2 and a felling arm 3. At its free end the guiding arm 2 has a member 4 for engaging a tree 5. At the free end of the felling arm 3 a harvesting tool 6 is arranged and adapted for engagement with the tree 5 at ground level as distinct from the tree engaging member 4 which is caused to engage the tree at a point spaced a considerable distance from the point at which the harvesting tool 6 is engaged with the tree. The arms 2 and 3 are connected to the power source of the tree harvesting machine 1 to permit moving the arms and driving the operating means of said arms.

The guiding arm 2 comprises at least two relatively movable sections 7 and 8. Section 7 is mounted by means of a horizontal pivot shaft 9 in a fastening 10 which is mounted in the superstructure 12 of the tree harvesting machine 1 with the aid of a vertical pivot shaft 11. A hydraulic cylinder and piston assembly (not shown) is inserted between section 7 of the guiding arm 2 and the fastening 10 to permit vertical pivotment of the guiding arm 2. For the horizontal pivotment of the guiding arm 2 said arm further is equipped with a cylinder and piston assembly (not shown). A cylinder and piston assembly 13 is inserted between sections 7 and 8 of the guiding arm 2 to bring about relative axial shifting of said sections, said assembly 13 being connected to fastenings 14, 15 on the guiding arm sections 8 and 7, respectively. At the free end of section 8 the tree engaging member 4 is pivotally mounted on a pivot shaft 16 and is equipped for its operation with a cylinder and piston assembly (not shown).

The felling arm 3 also comprises at least two sections 17 and 18. Section 17 is mounted for vertical swinging movement by means of a pivot shaft 19 in a fastening 20 which in turn is mounted for horizontal swinging movement in the superstructure 12 of the tree harvesting machine by means of a vertical pivot shaft (not shown). A hydraulic cylinder and piston assembly 21 is connected between section 17 and fastening 20. Sections 17 and 18 of the felling arm 3 are interconnected by means of a cylinder and piston assembly 22 which is connected to section 17 and 18, respectively, by fastenings 23 and 24. At the free end of section 18 the mounting and drive means 25 of the tool 6 is vertically pivotally mounted by means of a pivot shaft 26. For this purpose, the means 25 has a fork-shaped bearing 27, and a cylinder and piston assembly (not shown) is interconnected between the lower portion of said bearing and section 18. Connected between fastening 20 and felling arm 3 is a cylinder and piston assembly (not shown) to bring about the horizontal pivotment of the felling arm 3.

The means 25 mounting and driving the tool 6 comprises a frame 28 and bearings 29 for the tool 6 and a transmission (not shown) for making the tool 6 operative. Between the bearings 29 extends a member 30 which interconnects said bearings and is narrower than the tool 6 for a purpose that will appear from the following. The frame 28 further has supporting means 31 which in the embodiment illustrated is movable relative to the frame 28, the tool 6 and the bearings 29 thereof and which is disposed on the side of the tool 6 opposite to the tree engaging side thereof and in alignment with the tool, said supporting means having such dimensions that like the connecting member 30 it can be inserted in a cut 32 made by the tool 6 in the tree 5 for the felling thereof, all for purposes that will appear from the following. The connecting member 30 thus lies between the tool 6 and the supporting means 31. Further, both the connecting member 30 and the supporting means 31 are in the form of bars extending in parallel with the tool 6 and at right angles to the felling arm 3. The supporting means 31 which suitably is movable in relation to the frame 28, also has an abutment member 33 which in the embodiment shown by way of example is a projection at the underside of the supporting means and at the edge of said means facing away from the tool 6. As will appear particularly from FIGURE 6 the supporting means in cross section substantially has the shape of an angle iron. One limb of the angle iron, which is intended to serve as a support and has a thickened portion, can be inserted in the cut 32, and the other limb of said angle iron, which constitutes the abutment member 33, is adapted for engagement with the outer side of the tree for a purpose that will appear from the following. The abutment member 33 is adapted to hold the supporting means 31 in a position (FIGURE 3) in which the latter is partly inserted in the cut 32 made by the tool 6. Inserted respectively between the bearings 29 of the tool 6 and the frame 28, and between the supporting means 31 and the frame 28 is a hydraulic mechanism 34 and 35, respectively, which is connected to the power source of the harvesting apparatus in a manner not shown. Said hydraulic devices 34, 35 serve to move the tool 6 relative to the frame 28 and the supporting means 31, and said last-mentioned supporting means 31 relative to the tool 6.

The tool shown in FIGURES 3 and 4 has a helically coiled cutting edge 36 and an axial hollow 37 to facilitate discharge of the millings. The tool is constituted by a band 38 having the cutting edge 36 provided thereon. The band 38 has the cross section shown in FIGURE 5, two sides 39 and 40 of the cross section making a right angle with one another: the side 39 faces the hollow 37, and the side 40 constitutes the rear edge of the band 38. The band front side 41 and outer side 42 make an acute angle with one another, thus constituting the cutting edge 36, and obtuse angles with the sides 39 and 40. As will appear from FIGURE 4, this implies that on the outer side the tool 6 tapers from the cutting edge 36, which determines the largest diameter of the tool, towards the rear edge 40 and that a clearance is provided that makes it easier for the tool 6 to make the cut. The lead of the tool preferably is about 60°, but can be varied within broad limits and conformed to the speed of the tool and the advance rate thereof through the tree. The tool 6 has a conical member 43 which is engaged with the transmission (not shown) to cause the tool 6 to rotate. The length and diameter of the tool may of course vary and may be made larger or smaller, according to need. When shaped into the tool 6, the band 38 is bent in heated state round a suitable core, is hardened and formed into or equipped with sleeves at the ends, which sleeves serve to mount the tool and to connect it with the drive. It is imperative that the axial hollow 37 opens at the end of the tool against which the tool due to its screw shape carries the millings cut from the tree, said millings being discharged partly through the helically extending groove 44 in the tool and partly, to a major extent, through the mouth 45 of the axial hollow 37 at one end of the tool.

For felling a tree the tool 6 is first engaged with the tree 5 in the manner illustrated in FIGURE 1, whereupon the tool is caused to rotate for making the cut 32. After the tool rotation for making the cut 32 has started and is running smoothly, the supporting means 31, in the initial stage of making said cut, is inserted in the cut 32 between the surfaces thereof at or near the periphery of the tree in that the operating member 35 pulls the supporting means 31 into the cut 32. The support point formed by said supporting means 31 is fixed in relation to the tree 5, the log section to be divided being supported as the cut is completed, and when falling to the ground the log section is caused to pivot about the supporting means which constitutes a hinge for the divided log section. The fall of the tree and the guiding thereof in the desired direction of fall is brought about by relatively moving the guiding arm sections 7 and 8 and by the resulting lengthening of said guiding arm. The supporting means 31 can be introduced into the cut 32 only to the extent determined by the abutment member 33 which is applied against the outer side of the tree when the arm 3 is shortened for engagement of the tool 6 with the tree, and shortly afterwards the supporting means 31 is inserted in the cut 32. As a result of the abutment member 33 bearing against the tree on the side thereof opposite to the point of application of the guiding arm 2 against the tree, the tree harvesting machine 1 will take a very stable position during the entire harvesting operation when the tree is severed from the root and is caused to fall to the ground. Work can therefore be carried out rapidly without any change of position of the machine.

The tool 6 can also be manufactured by providing a bar or tube of suitable material with the axial hollow 37 and/or the helically extending groove 44.

The supporting means 31 can either be movable in relation to the frame 28 in the manner described, which will make the entire apparatus readily maneuverable, or said means can be stationary relative to said frame 28.

In an alternative embodiment the supporting means 31 can be releasable by means of a releasable blocking device. When the tool 6 starts making the cut and the connecting member 30 is introduced between the surfaces of the cut the supporting means 31 is taken along in the movement until the abutment member 33 prevents a further movement of the supporting means, the blocking device being then released.

Further modifications are conceivable within the scope of the invention defined in the appended claims.

What we claim and desire to secure by Letters Patent is:

1. An elongated tool for use in apparatus for harvesting standing timber or dividing felled trees or tree sections, said tool having a helically coiled cutting edge and being adapted for rotation about its longitudinal axis, wherein the helically coiled cutting edge of the tool is formed by one edge, located in the outer periphery of the tool, of a helically coiled band constituting the tool, said band defining, between the cutting edge of one convolution of the band and the rear edge of the adjacent convolution, a likewise helically extending groove which communicates with an axial hollow delimited by the band.

2. A tool as claimed in claim 1, wherein the diameter of the tool in each convolution of the band decreases from that band edge which forms the cutting edge and determines the largest diameter of the tool, to the rear edge of the same convolution, which edge determines the smallest diameter of the tool.

3. A tool as claimed in claim 2, wherein the band is of substantially tapered cross section.

4. A tool as claimed in claim 1, which at its ends is carried by and is mounted in bearings, wherein the hollow defined by the band extends at least through that bearing against which the millings cut by the helically coiled cutting edge are advanced during operation of the tool.

References Cited

UNITED STATES PATENTS 337,018   3/1886   Rendall _____ 144—34

FRANCIS S. HUSAR, Primary Examiner

U.S. Cl. X.R.

29—103; 83—672; 144—34